United States Patent
Wang

(10) Patent No.: US 10,824,488 B2
(45) Date of Patent: Nov. 3, 2020

(54) DEVICE DETECTION METHOD AND SYSTEM, ELECTRONIC DEVICE, CLOUD ROBOT SYSTEM, AND COMPUTER PROGRAM PRODUCT

(71) Applicant: CLOUDMINDS (SHENZHEN) ROBOTICS SYSTEMS CO., LTD., Shenzhen (CN)

(72) Inventor: Yonghui Wang, Shenzhen (CN)

(73) Assignee: CLOUDMINDS (SHENZHEN) ROBOTICS SYSTEMS CO., LTD., Shenzhen (CN)

( * ) Notice: Subject to any disclaimer, the term of this patent is extended or adjusted under 35 U.S.C. 154(b) by 0 days.

(21) Appl. No.: 16/448,363

(22) Filed: Jun. 21, 2019

(65) Prior Publication Data

US 2019/0310904 A1    Oct. 10, 2019

Related U.S. Application Data

(63) Continuation of application No. PCT/CN2016/111597, filed on Dec. 22, 2016.

(51) Int. Cl.
| | |
|---|---|
| G06F 9/54 | (2006.01) |
| G06F 21/44 | (2013.01) |
| G06F 21/57 | (2013.01) |
| G06F 21/74 | (2013.01) |

(52) U.S. Cl.
CPC .............. *G06F 9/546* (2013.01); *G06F 9/545* (2013.01); *G06F 21/44* (2013.01); *G06F 21/575* (2013.01); *G06F 21/74* (2013.01)

(58) Field of Classification Search
None
See application file for complete search history.

(56) References Cited

U.S. PATENT DOCUMENTS

| | | | |
|---|---|---|---|
| 2005/0102683 A1 | 5/2005 | Branson et al. | |
| 2015/0350005 A1* | 12/2015 | Singh | |
| 2016/0360412 A1* | 12/2016 | Wilson | |
| 2017/0203436 A1* | 7/2017 | Wei | |

FOREIGN PATENT DOCUMENTS

| | | |
|---|---|---|
| CN | 102469098 A | 5/2012 |
| CN | 103036916 A | 4/2013 |
| CN | 103731309 A | 4/2014 |
| CN | 105812364 A | 7/2016 |

OTHER PUBLICATIONS

International Search Report dated Sep. 22, 2017 in corresponding International application No. PCT/CN2016/111597; 6 pages.

* cited by examiner

*Primary Examiner* — Syed A Roni
(74) *Attorney, Agent, or Firm* — Maier & Maier, PLLC

(57) ABSTRACT

The present application provides a device detection method and system, an electronic device, a cloud robot system. The method includes: in a first operating system, when a device detection instruction sent by a device detection program is detected, determining a driving program operation instruction corresponding to the device detection instruction, and transmitting the driving program operation instruction to a second operating system; in the second operating system, operating a corresponding driving program according to the driving program operation instruction, and feeding back an operation result to the first operating system; and in the first operating system, returning the operation result to the device detection program.

6 Claims, 5 Drawing Sheets

---

In a first operating system, when a device detection instruction sent by a device detection program is detected, determining a driving program operation instruction corresponding to the device detection instruction, and transmitting the driving program operation instruction to a second operating system — 101

In the second operating system, operating a corresponding driving program according to the driving program operation instruction, and feeding back an operation result to the first operating system — 102

In the first operating system, returning the operation result to the device detection program — 103

DEVICE DETECTION METHOD AND SYSTEM, ELECTRONIC DEVICE, CLOUD ROBOT SYSTEM, AND COMPUTER PROGRAM PRODUCT

CROSS-REFERENCE TO RELATED APPLICATION

The present application is a continuation application under 35 U.S.C. § 120 of PCT application No. PCT/CN2016/111597 filed on Dec. 22, 2016, the contents of which are incorporated herein by reference.

FIELD

The present application relates to the field of virtualization technologies, and in particular to a device detection method and system, an electronic device, a cloud robot system, and a computer program product.

BACKGROUND

In the prior art, a computer can call a driving program interface of a system device to run driving programs to achieve various operations of the system device. In some cases, detection, setting or repairing and other operations need to be performed on the driving programs themselves, these operations usually require higher permissions, the permissions are generally open to a kernel level application program, and power-off, power-on and other various repetitive operations of the system device corresponding to these driving programs may be involved in the operation process of the driving programs, resulting in that the upper layer application programs are not available. Therefore, when the driving programs of the system device are operated, it is usually necessary to restart a computer to enter a security mode with higher permission, the working principle of the security mode is to start a computer operating system without loading the driving program of a third party device, so that the computer operating system runs in a system minimum modem, and thus the operation on the driving programs of the system device is not affected by the third party device.

The shortcomings of the prior art mainly lie in that: when it is desired to detect the driving programs of the system device, it is necessary to restart the operating system to enter the security mode, so that many application programs in the original computer system cannot be used, and these application programs can be normally used until the operating system is restarted to resume the normal operation mode, such that the user operation is inconvenient; and if the detection permission of the driving programs of the system device is directly opened to the normal operation mode, although multiple times of restart are not required, great security risks are brought.

SUMMARY

The embodiment of the present application provides a device calling method and system, an electronic device, a cloud robot system and a computer program product for mainly solving the following problems: when it is desired to detect driving programs of a system device, it is necessary to restart an operating system to enter a security mode, so that many application programs in the original computer system cannot be used, and these application programs can be normally used until the operating system is restarted to resume a normal operation mode, such that the user operation is inconvenient; and if the operation permission of the driving programs of the system device is directly opened to the normal operation mode, although multiple times of restart are not required, great security risks are brought.

In one aspect, the embodiment of the present application provides a device detection method, including:

in a first operating system, when a device detection instruction sent by a device detection program is detected, determining a driving program operation instruction corresponding to the device detection instruction, and transmitting the driving program operation instruction to a second operating system;

in the second operating system, operating a corresponding driving program according to the driving program operation instruction, and feeding back an operation result to the first operating system; and in the first operating system, returning the operation result to the device detection program.

In another aspect, the embodiment of the present application provides a device detection system, including:

a first operation module, configured to: in a first operating system, when a device detection instruction sent by a device detection program is detected, determine a driving program operation instruction corresponding to the device detection instruction, and transmit the driving program operation instruction to a second operating system;

a second operation module, configured to: in the second operating system, operate a corresponding driving program according to the driving program operation instruction, and feed back an operation result to the first operating system; and the first operation module further configured to: in the first operating system, return the operation result to the device detection program.

In another aspect, the embodiment of the present application provides an electronic device, wherein the electronic device includes: an external device, a memory, one or more processors, and one or more modules, the one or more modules are stored in the memory and are configured to be executed by the one or more processors, and the one or more modules include instructions for executing various steps in the above method.

In another aspect, the embodiment of the present application provides a cloud robot system, wherein the cloud robot system includes: a robot terminal device and a cloud server; and the cloud server includes: a first communication device, a first memory, one or more first processors, and one or more first modules, the one or more first modules are stored in the first memory and are configured to be executed by the one or more first processors, and the one or more first modules include instructions for executing various steps executed in the first operating system in the method according to any one of claims 1-5.

The robot terminal device includes: an external device, a second communication device, a second memory, one or more second processors, and one or more second modules, the one or more second modules are stored in the second memory and are configured to be executed by the one or more second processors, and the one or more second modules include instructions for executing various steps executed in the second operating system in the method according to any one of claims 1-5.

In another aspect, the embodiment of the present application provides a computer program product, wherein the computer program product includes a computer readable storage medium and a computer program mechanism embedded therein, and the computer program mechanism includes instructions for executing various steps in the above method.

The beneficial effects of the application are as follows:

According to the device detection method provided by the present application, in a device detection process, the first operating system sends the driving program operation instruction to the second operating system, the second operating system feeds back the operation result to the first operating system after executing the operation instruction, the device detection in the second operating system by the first operating system is achieved, and on one hand, the second operating system does not need to be restarted, so that the user operation is convenient; and on the other hand, the device detection program of the second operating system is isolated from the application program in the second operating system to improve the security.

BRIEF DESCRIPTION OF THE DRAWINGS

Specific embodiments of the present application will be described below with reference to the drawings, in which.

DETAILED DESCRIPTION

The inventor noticed during the invention process that: when it is desired to detect a driving program of a system device, it is necessary to restart an operating system to enter a security mode, so that many application programs in the original computer system cannot be used, and these application programs can be normally used until the operating system is restarted to resume a normal operation mode, such that the user operation is inconvenient; and if the detection permission of the driving program of the system device is directly opened to the normal operation mode, although multiple times of restart are not required, great security risks are brought.

In view of the above deficiencies, the present application provides a device detection method, in a device detection process, a first operating system sends a driving program operation instruction to a second operating system, the second operating system feeds back an operation result to the first operating system after executing the operation instruction, the device detection in the second operating system by the first operating system is achieved, and on one hand, the second operating system does not need to be restarted, so that the user operation is convenient, and on the other hand, a device detection program of the second operating system is isolated from an application program in the second operating system to improve the security.

Multiple operating systems can be run in a virtualization system architecture, including a host operating system (host OS) and one or more guest operating systems (guest OS), the host operating system is run on a host, one or more guest virtual machines, i.e., guests, are run on the host operating system, each guest is run as an application program of the host operating system, the guest can simulate a hardware device for the guest operating system running on the guest for use by the guest operating system, and various application programs can be run in the guest operating systems run in the guests. Based on the virtualization system architecture, the sharable hardware devices among the multiple operating systems include system devices and peripherals or the like. In order to facilitate the implementation of the present application under the above architecture, the following description will be made by way of example.

First Embodiment

Figure 1:
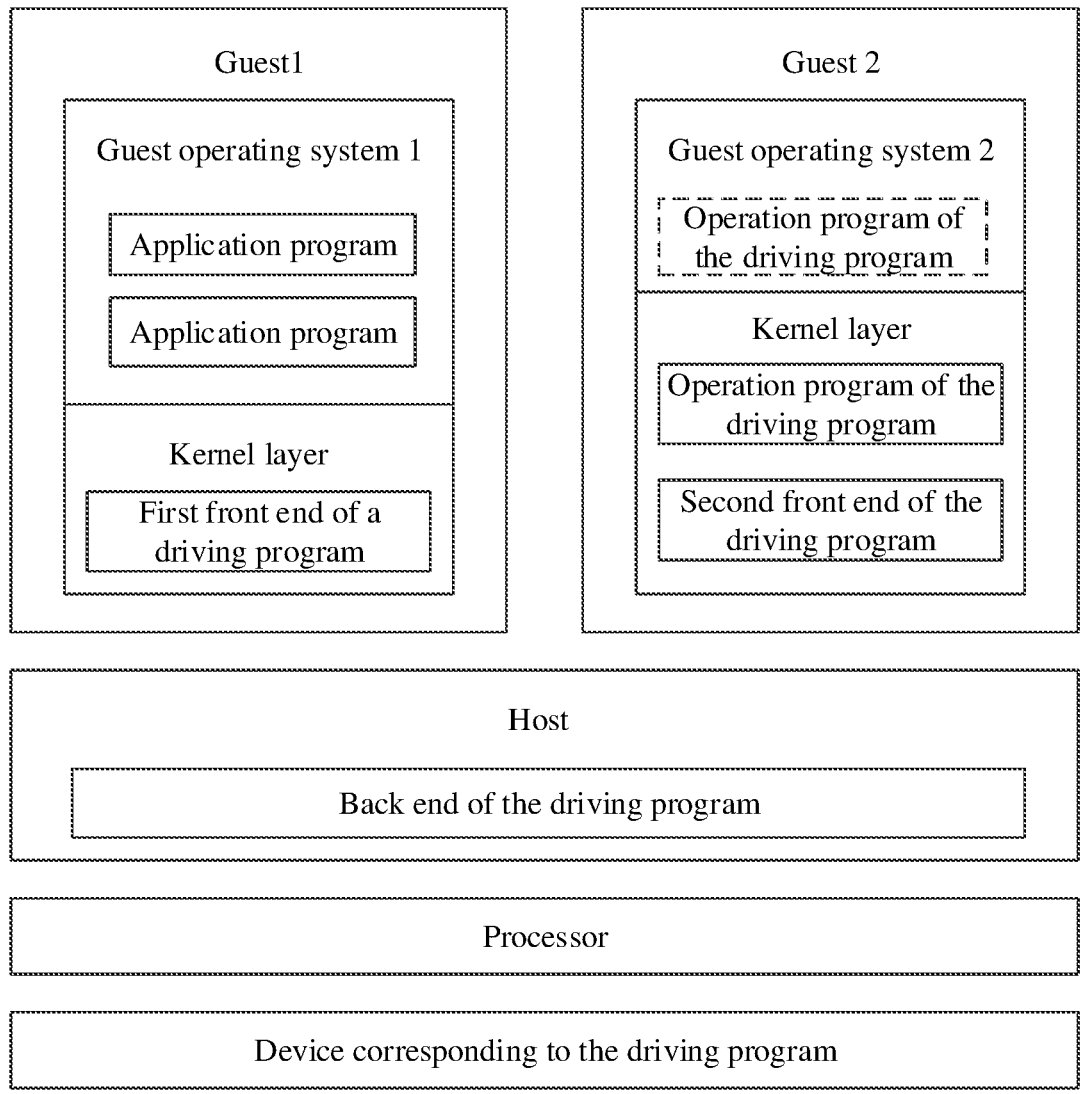
FIG. 1 shows a schematic diagram of a system architecture applicable to a device detection method in a first embodiment of the present application.

FIG. 1 shows a system architecture diagram applicable to a device detection method in a first embodiment of the present application. In the present embodiment, at least two guests are run in the virtualization system architecture, for a certain system device, a back end of the driving program of the system device is run in the host (Host), and corresponding to the back end of a driving program of the system device, a first front end of the driving program of the system device is run in the guest 1. When the application program in the guest 1 needs to call the system device to implement some functions, the guest 1 can forward an operation instruction of the system device to the back end of the driving program through the first front end to call the driving program corresponding to the system device so as to drive the system device to execute the operation instruction. In the present embodiment, the guest operating system 2 run by the guest 2 is a first operating system, and the host operating system (Host OS) is a second operating system.

Figure 2:
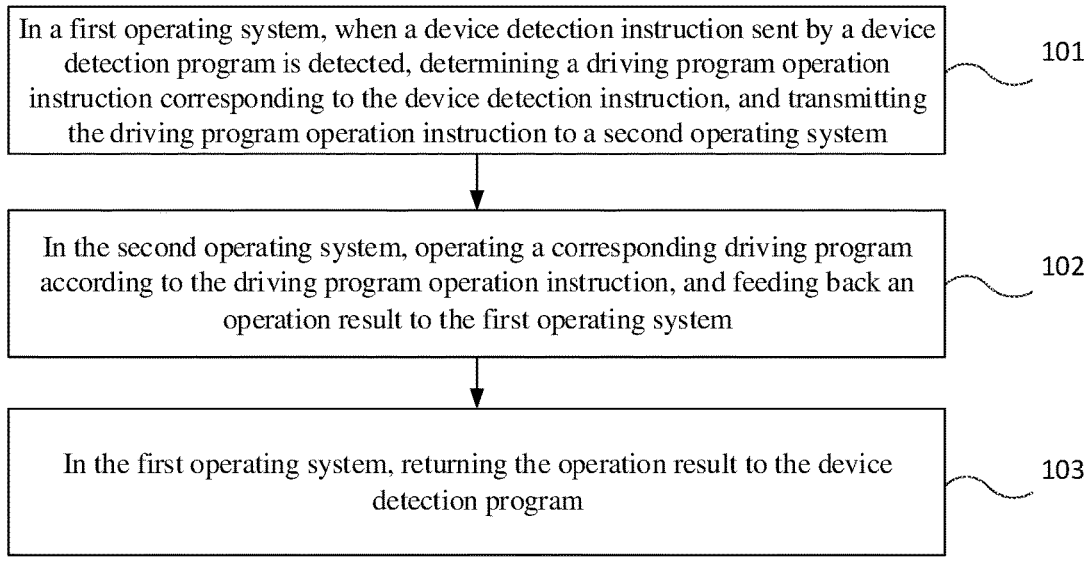
FIG. 2 shows a schematic flow diagram of the device detection method in the first embodiment of the present application.

FIG. 2 shows a schematic flow diagram of the device detection method in the first embodiment of the present application, the method is implemented in the virtualization system architecture as shown in FIG. 1 and as shown in FIG. 2, the device detection method includes:

Step 101, in a first operating system, when a device detection instruction sent by a device detection program is detected, determining a driving program operation instruction corresponding to the device detection instruction, and transmitting the driving program operation instruction to a second operating system;

step 102, in the second operating system, operating a corresponding driving program according to the driving program operation instruction, and feeding back an operation result to the first operating system; and step 103, in the first operating system, returning the operation result to the device detection program.

In the step 101, detection programs of the device driving program are run in the guest operating system 2 run by the guest 2, these detection programs can issue instructions of detecting the driving program itself, because the operation procedures of the driving program require higher permissions, so the operation procedures are usually run in a kernel layer. In some cases, the operation program of the driving program can also be run on an upper layer of the operating system at the same time, so that the user can obtain the operation result to perform subsequent processing. These detection programs of the driving program issue detection instructions to a second front end of the driving program in the guest 2 of the driving program of the system device, and the second front end forwards the operation instructions corresponding to the detection instructions to the back end of the driving program of the host operating system.

In some embodiments, only when it is determined that the driving program operation instruction satisfies preset security conditions, the corresponding driving program is operated according to the driving program operation instruction.

Because the operation on the own driving program of the system device often seriously affects the running of the system, it is usually necessary to limit the initiation of such operation, and it can be limited that only the driving program operation instruction satisfying the preset security conditions can be executed. These preset security conditions can be that an initiator of the operation instruction is an operating system of a particular local guest, or an operating system of the guest running locally in a particular mode or state; or an operating system in a non-local remote terminal, or an operating system of a guest running in a particular mode or state in the remote terminal.

In some embodiments, the preset security conditions include that the security level of the first operating system is greater than a preset level.

That is, it is limited that only the driving program operation instruction issued by an internal operating system running in the local guest satisfying the security level requirements satisfies the preset security conditions. Multiple guests are usually run in a terminal having the virtualization system architecture, and the security levels of these guests are different, for example, in a terminal for work, an enterprise virtual machine is used for processing work-related transactions, and its security level is usually higher than a user virtual machine used for processing user personal transactions; for example, in some terminals, dedicated guests are run to monitor the running conditions of other guests and the hosts to prevent the virtual machines in the virtualization architecture from being maliciously tampered, the security levels of the dedicated guests for monitoring are usually higher than those of other guests. Because the operation on the driving program itself of the system device usually seriously affects the running of the system, if the initiator is the operating system of a certain local guest of the terminal, then guest running the operating system needs to meet certain security level requirements so as to prevent the driving program of the system device from being easily operated.

In some embodiments, the preset security conditions include that the first operating system is an operating system securely running in a system minimum mode.

That is, it is limited that only the driving program operation instruction issued by the internal operating system running in the system minimum mode in the local guest satisfies the preset security conditions. Usually, the operation on the driving program itself of the system device usually seriously affects the running of the system, that is, other application programs cannot be run at the same time, it is also desired to avoid the impact of other third party application programs on the operation process in the detection, modification or repair process of the driving program, therefore if the initiator is the operating system of a certain local guest of the terminal, then the operating system needs to run in the system minimum mode, that is, in a mode in which the third party device driving program is not loaded, similar to the security mode of the existing computer operating system, the guest operating system in this mode is not affected by the third party device when performing various operations on the driving program of the system device and is more secure.

In some embodiments, the preset security conditions include that the first operating system is an authenticated operating system.

In order to avoid the security risk of the operating system that initiates the detection operation instruction to the driving program, when each guest is started, software security check or system security scoring and other security verification can be performed on each guest; or, after the operation instruction is received, the security authentication in the form of signature comparison can be performed on the initiator of the operation instruction, that is, a signature operation is performed on the guest operating system of the operation instruction initiator and is compared with a pre-stored signature result, and if the same, it indicates that the guest operating system is not tampered and is an authenticated operating system.

In the step 102, in the second operating system, the corresponding driving program is operated according to the driving program operation instruction; and the operation result is fed back to the first operating system.

After the host operating system completes the detection operation of the driving program according to the driving program operation instruction forwarded by the second front end in the guest operating system 2, the operation result is fed back to the second front end of the guest 2 by the back end of the driving program.

In some embodiments, only when the corresponding driving program is in an idle state, the corresponding driving program is operated according to the driving program operation instruction.

Whether the driving program is in the idle state is judged, that is, whether the back end of the device driving program is currently occupied is judged, the most possible occupation manner is that the application program run by the guest operating system 1 in the guest 1 is calling the back end of the driving program via the first front end of the driving program so as to operate the system device corresponding to the driving program. If the driving program is not occupied by the back end of the driving program at present, then the operation instruction of the guest 2 on the driving program is executed, so that the driving program completes the related operation, that is, the operation instruction forwarded by the second front end of the driving program in the guest 2 is forwarded to the back end of the device driving program to achieve the operation on the driving program itself when the driving program is idle.

In the present step, if the driving program is currently occupied by the guest operating system 1 in the guest 1, then operation instruction of the driving program of the system device is not executed temporarily, and the calling of the system device by the application program in the operating system 1 is not affected. After the calling of the system device by the application program in the operating system 1 is completed, the operation instruction issued by the guest 2 to the driving program can be executed, at this time, the guest operating system 1 does not need to be restarted, and since the first front end of the driving system is run in the guest operating system 1, the guest operating system still can normally issue a call request to the system device without crashing.

In the step 103, the second front end feeds back the operation result, that is, the detection result, to the detection program that initiates the detection operation in the guest 2 so as to complete the operation flow of the driving program of the system device by the guest operating system 2 in the guest 2.

In the present embodiment, in the device detection process, the first operating system sends the driving program operation instruction to the second operating system, the second operating system feeds back the operation result to the first operating system after executing the operation instruction, the device detection in the second operating system by the first operating system is achieved, and on one hand, the second operating system does not need to be restarted, so that the user operation is convenient; and on the other hand, the device detection program of the second operating system is isolated from the application program in the second operating system to improve the security. When the operation initiator of the driving program is the operating system of the local guest, it can be limited that the operation instruction of the driving program needs to satisfy the preset security conditions to improve the security; for example, it can be required that the guest has a higher security level to prevent the driving program of the system device from being easily tempered, it can also be required that the operating system of the guest is run in the system minimum mode to avoid the impact of the third party program driving on the operation of the driving program of the system device, and it can also be required that the guest is a guest passing the security authentication to prevent the insecure guest from performing illegal operations on the driving program. Whether the driving program is idle is judged to perform the corresponding program thereon, thereby avoiding conflicts in the system.

Second Embodiment

Figure 3:
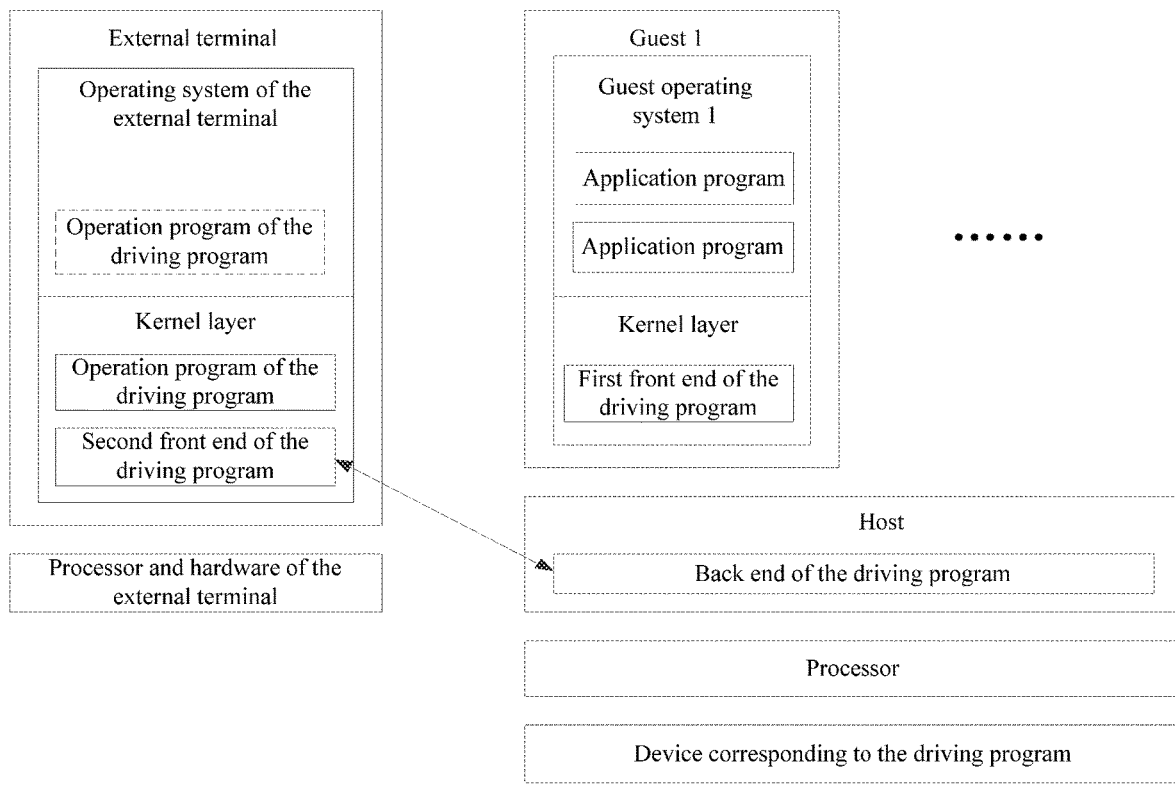
FIG. 3 shows a schematic diagram of a system architecture applicable to a device detection method in a second embodiment of the present application.

FIG. 3 shows a system architecture diagram applicable to a device detection method in the second embodiment of the present application. In the present embodiment, at least one guest is run in the local virtualization system architecture, for a certain system device, a back end of a driving program of the system device is run in the host (Host), and corresponding to the back end of the driving program of the system device, a first front end of the driving program of the system device is run in the guest 1. When the application program in the guest 1 needs to call the system device to implement some functions, an operation instruction of the system device can be forwarded to the back end of the driving program through the first front end to call the driving program corresponding to the system device so as to drive the system device to execute the operation instruction.

For the device detection method in the present embodiment, reference can be made to the description of the steps 101 to 103 in the first embodiment, the difference is that the first operating system and the second operating system are located on different terminals in the present embodiment, that is, the operation initiator in the corresponding step 101 is an operating system of an external terminal, and the second front end of the driving program is run on the kernel layer of the operating system of the external terminal, which can be understood as a virtual front end, a communication connection is established between the second front end and the back end of the driving program of a local terminal, the operation program of the driving program running in the operating system of the external terminal can forward the operation instruction of the driving program to the back end of the driving program of the local terminal through the second front end of the driving program, thereby calling the driving program corresponding to the system device to drive the system device to execute the operational instruction.

In the present embodiment, the operation permission of the driving program of the system device is provided for the external terminal, and the external terminal can be a platform server, so that the maintainer can conveniently operate the driving program of the system device in a certain terminal on a platform side. Correspondingly, the operation permission of the driving program of the system device can no longer be opened to any local guest, thereby preventing a certain guest or operating system of the terminal from performing illegal operations on the driving program of the system device after being tampered.

In some embodiments, only when it is determined that the driving program operation instruction satisfies preset security conditions, the corresponding driving program is operated according to the driving program operation instruction.

Because the operation on the driving program itself of the system device often seriously affects the running of the system, it is usually necessary to limit the initiation of such operation, and it can be limited that only the driving program operation instruction satisfying the preset security conditions can be executed. These preset security conditions can be that an initiator of the operation instruction is an operating system in a non-local remote terminal, or an operating system of a guest running in a particular mode or state in the remote terminal.

In some embodiments, the preset security conditions include that the security level of the first operating system is greater than a preset level.

That is, it is limited that only the driving program operation instruction issued by an external operating system running in the external terminal satisfying the security level requirements satisfies the preset security conditions. When multiple external terminals are present in the system, the security levels of these external terminals are different, or, when one or more external operating systems are run in the external terminals, the security levels of these operating systems are also different. Because the operation on the driving program itself of the system device usually seriously affects the running of the system, if the initiator is a certain external operating system of the external terminal, then the external terminal running the operating system needs to meet certain security level requirements, or the external operating system needs to meet certain security level requirements, so as to prevent the driving program of the system device from being easily operated.

In some embodiments, the preset security conditions include that the first operating system is an operating system securely running in a system minimum mode.

That is, it is limited that only the driving program operation instruction issued by the external operating system running in the system minimum mode in the external terminal satisfies the preset security conditions. Usually, the operation on the driving program itself of the system device usually seriously affects the running of the system, that is, other application programs cannot be run at the same time, it is also desired to avoid the impact of other third party application programs on the operation process in the detection, modification or repair process of the driving program, therefore if the initiator is the operating system of the external terminal, then the operating system needs to run in the system minimum mode, that is, in a mode in which the third party device driving program is not loaded, that is, the external terminal provides a security mode similar to the existing computer operating system, the operating system of the external terminal in this mode is not affected by the third party device in the operating system of the external terminal when performing various operations on the driving program of the system device of the current terminal and is more secure.

In some embodiments, the preset security conditions include that the first operating system is an authenticated operating system.

That is, it is limited that only the driving program operation instruction issued by the external operating system running in the external operating system of an external terminal passing the security authentication satisfies the preset security conditions. The current terminal can establish a connection with multiple external terminals, but whether the operating systems of these external terminals can act as the initiators of the operation of the driving program of the system device of the current terminal needs to be subject to the security authentication at first. The security authentication can be authentication performed according to a terminal model number and a terminal identifier of the external terminal, that is, only the operating system running on the authenticated external terminal can be used as the operation initiator. The security authentication can also be authentication performed according to the information of the operating system of the external terminal, that is, on one hand, the authority of the external terminal on which the operating system runs can be limited, on the other hand, the permissions of different operating systems on the terminals can also be limited, for example, multiple guests are run on a certain external terminal, only the operating system in the guest with higher security performance can operate the driving program of the system device of the current terminal based on the communication connection with the current terminal.

The operation of the driving program of the system device of the current terminal usually seriously affects the operation of the system, so if the initiator is the operating system of the external terminal, the security authentication needs to be performed on the operating system to prevent the driving program of the system device from being easily operated by the external terminal.

In some embodiments, only when the corresponding driving program is in an idle state, the corresponding driving program is operated according to the driving program operation instruction.

Whether the driving program is in the idle state is judged, that is, whether the back end of the device driving program is currently occupied is judged, the most possible occupation manner is that the application program run by the guest operating system 1 in the local guest 1 of the system device is calling the back end of the driving program via the first front end of the driving program so as to operate the system device corresponding to the driving program. If the driving program is not occupied by the back end of the driving program at present, then the operation instruction of the external operating system in the external terminal on the driving program is executed, so that the driving program completes the related operation, that is, the operation instruction forwarded by the second front end of the driving program in the external operating system is forwarded to the back end of the device driving program in the host to achieve the operation on the driving program itself when the driving program is idle.

In the present step, if the driving program is currently occupied by the local guest, then operation instruction of the external terminal on the driving program of the system device is not executed temporarily, and the calling of the system device by the local application program is not affected. After the calling of the system device by the application program in the local application program is completed, the operation instruction issued by the external terminal to the driving program can be executed, at this time, the local guest operating system 1 does not need to be restarted, and since the first front end of the driving system is run in the local guest operating system 1, the local guest operating system can normally issue a call request to the system device without crashing.

In the present embodiment, in the device detection process, the first operating system sends the driving program operation instruction to the second operating system, the second operating system feeds back the operation result to the first operating system after executing the operation instruction, the device detection in the second operating system by the first operating system is achieved, and on one hand, the second operating system does not need to be restarted, so that the user operation is convenient; and on the other hand, the device detection program of the second operating system is isolated from the application program in the second operating system to improve the security. When the operation initiator of the driving program is the external operating system of the external terminal, it can be limited that the operation instruction of the driving program needs to satisfy the preset security conditions to improve the security; for example, it can be required that the external terminal or the external operating system run in the external terminal has a higher security level, or, it can also be required that the external operating system of the external terminal passes the security authentication to prevent the driving program of the system device from being easily tempered by any external terminal, and it can also be required that the external operating system of the external terminal runs in the system minimum mode to avoid the impact of the third party program driving on the operation of the driving program of the system device.

Third Embodiment

Figure 4:
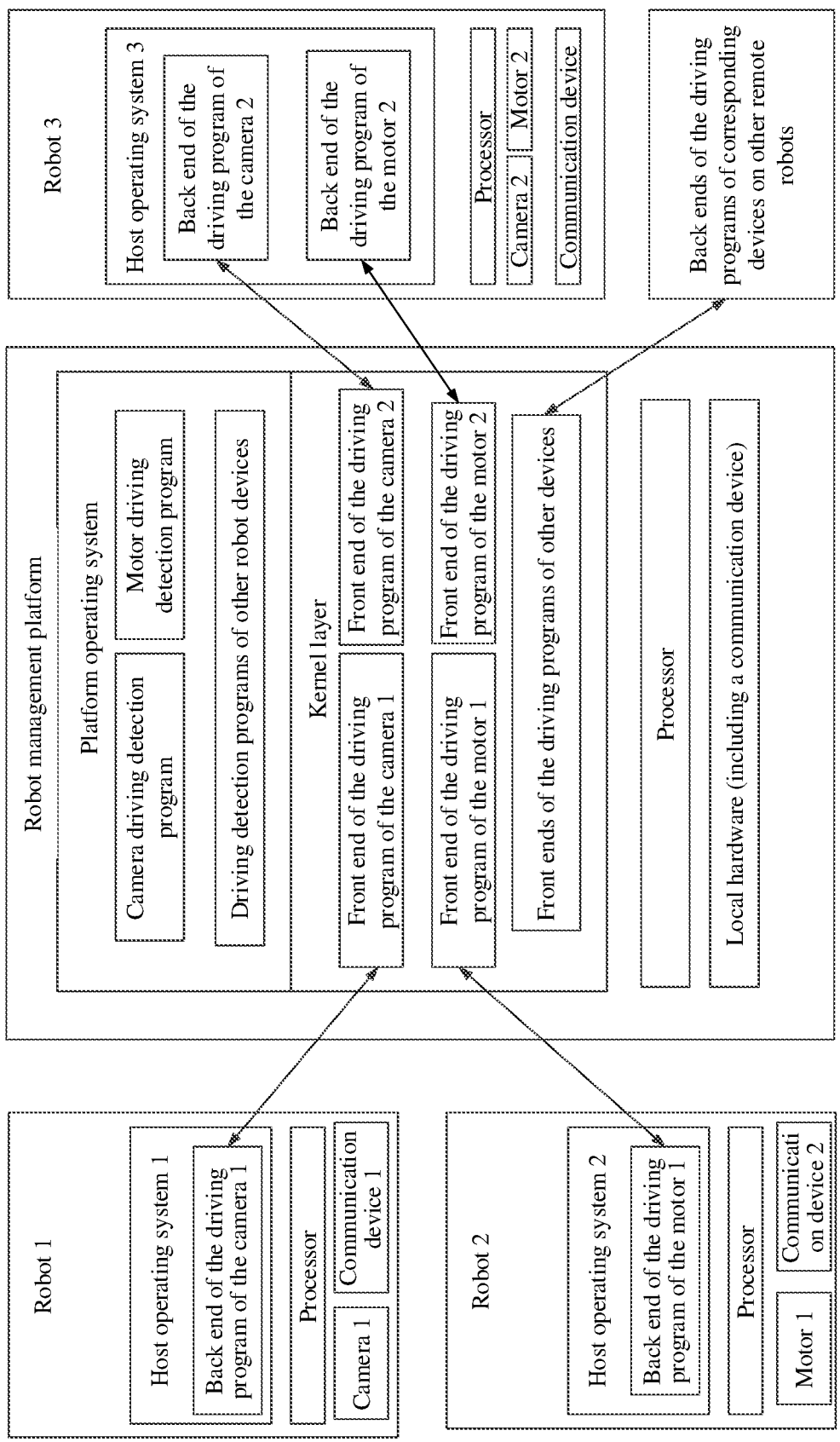
FIG. 4 shows a schematic diagram of a system architecture of a device detection system in a third embodiment of the present application.

FIG. 4 shows a schematic diagram of a system architecture of a device driving program detection system in the third embodiment of the present application. The present embodiment provides a robot management platform, and a driving program detection program, such as a camera driving detection program and a motor driving detection program and the like, of a device involved by each robot in a robot system is run thereon, and when the models of the devices on the robots are different, different detection programs of different driving programs can be involved. An operating system of the management platform establishes a network connection with a host operating system of each robot through communication devices on a platform side and each robot side on the basis of the TCP/IP (Transmission Control Protocol/Internet Protocol), and implements a front end of the driving program of a virtual device in a kernel layer of the operating system. In the operating system of the management platform, whether a detected robot device is a local device or a remote device is not sensed, the code and operation for detecting the remote and local robot devices are completely identical, and the detection results of the respective robot devices can be further summarized or visualized. Therefore, the robot management platform can detect the device state of the remote robot in real time, and can accurately grasp the state information of the remote device and the driving, thereby realizing real-time scheduling, refinement operation, maintenance and other in-time processing of the remote device.

When the operating system of the robot is run in the virtualization architecture, the back end of the driving program of the robot device such as the back end of the camera driving program or the back end of the motor driving program is run in the host machine. On one hand, the front end (not shown in the drawing) of the driving program of the robot device is run in the guest of the robot, so that the guest operating system of the robot can normally call hardware devices of the robot to execute related operations, and on the other hand, the front ends of the driving programs of these hardware devices are also run in the platform operating system, so that the platform side can perform underlying detection on the driving programs of various devices of the robots when the robots are idle. In this embodiment, the robots not only realize the isolation of normal services and detection tasks to ensure better security, but also ensure that the remote management platform performs the detection tasks when the robots are idle to ensure the local efficiency of the robots in the case that the robots can normally and independently control the robot devices.

Fourth Embodiment

Figure 5:
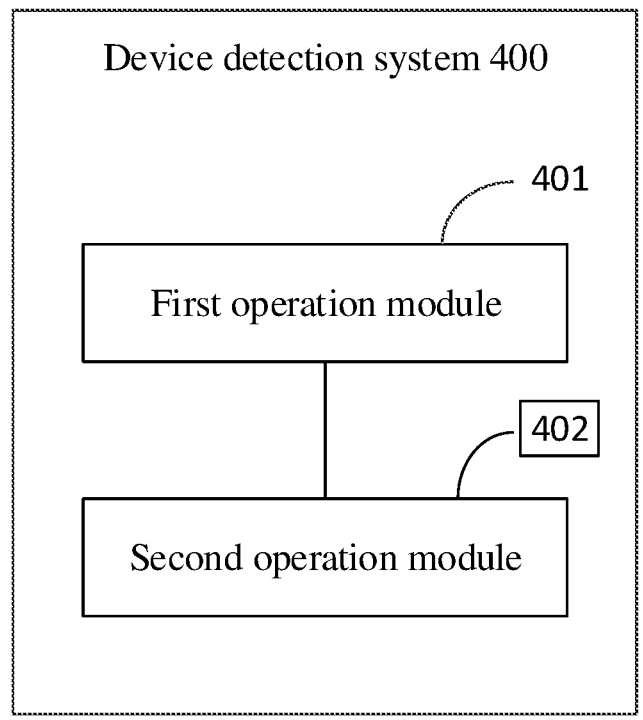
FIG. 5 shows a schematic diagram of a system architecture of a device detection system in a fourth embodiment of the present application.

Based on the same inventive concept, the embodiment of the present application further provides a device detection system 400. Since the principle of these systems to solve the problem is similar to the device detection method, the implementation of these systems can refer to the implementation of the method, and repeated parts are not repeatedly described herein. FIG. 5 shows a structural schematic diagram of the device detection system 400 in the fourth embodiment of the present application, as shown in the figure, the system 400 is applied to a virtualization system architecture, the virtualization system architecture at least includes a back end of a driving program and a first front end of the driving program, wherein the system 400 comprises:

a first operation module 401, configured to: in a first operating system, when a device detection instruction sent by a device detection program is detected, determine a driving program operation instruction corresponding to the device detection instruction, and transmit the driving program operation instruction to a second operating system;

a second operation module 402, configured to: in the second operating system, operate a corresponding driving program according to the driving program operation instruction, and feed back an operation result to the first operating system; and the first operation module 401 further configured to: in the first operating system, return the operation result to the device detection program. In some embodiments, operating a corresponding driving program according to the driving program operation instruction refers to:

Only when it is determined that the driving program operation instruction satisfies preset security conditions, the corresponding driving program is operated according to the driving program operation instruction.

In some embodiments, the preset security conditions include:

the security level of the first operating system is greater than a preset level; or, the first operating system is an operating system securely running in a system minimum mode; or, the first operating system is an authenticated operating system.

In some embodiments, the first operating system and the second operating system are located on different terminals.

That is, the first operation module and the second operation module can be located on different terminals, which is not shown in FIG. 5.

In some embodiments, operating the corresponding driving program according to the driving program operation instruction refers to only when the corresponding driving program is in an idle state, the corresponding driving program is operated according to the driving program operation instruction.

Fifth Embodiment

Figure 6:
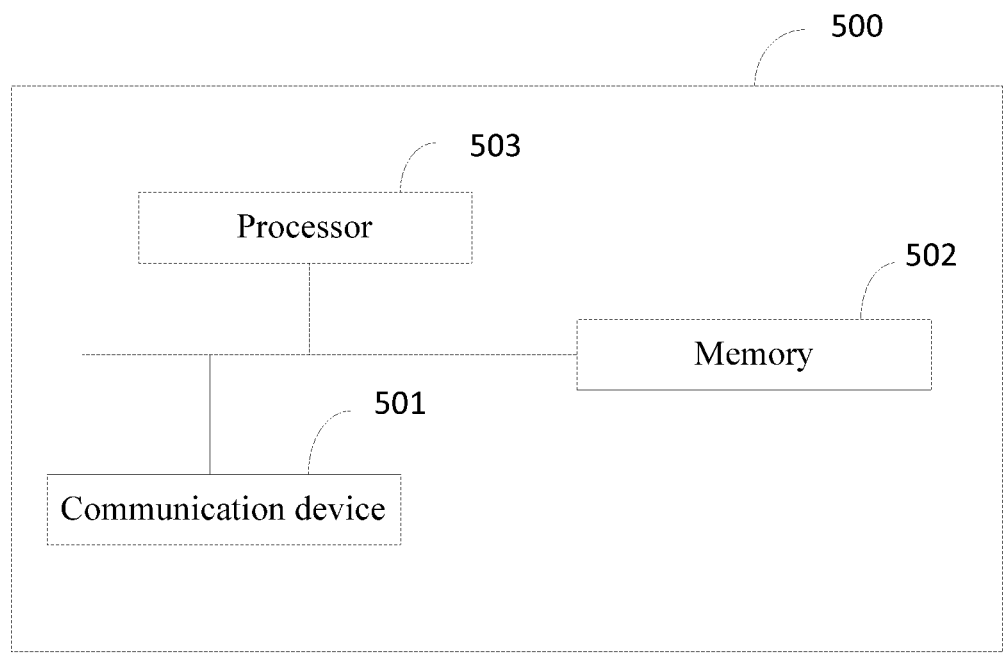
FIG. 6 shows a schematic diagram of an electronic device in a fifth embodiment of the present application.

Based on the same inventive concept, the embodiment of the present application further provides an electronic device. Since the principle is similar to the device detection method, the implementation can refer to the implementation of the method, and the repeated parts are not described herein again. As shown in FIG. 6, the electronic device 500 includes: an external device 501, a memory 502, one or more processors 503, and one or more modules, wherein the one or more modules are stored in the memory and are configured to be executed by the one or more processors, and the one or more modules include instructions for executing various steps in any one of the above methods.

The external device is a device that is connected to the electronic device and runs its driving program in the electronic device.

Sixth Embodiment

Figure 7:
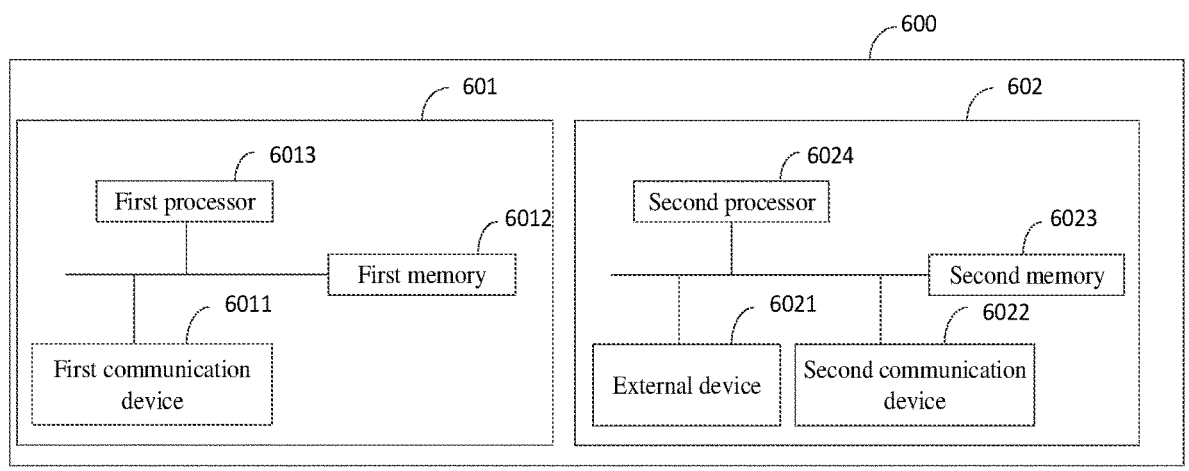
FIG. 7 shows a schematic diagram of a cloud robot system in a sixth embodiment of the present application.

Based on the same inventive concept, the embodiment of the present application further provides a cloud robot system. Since the principle is similar to the device detection method, the implementation can refer to the implementation of the method, and the repeated parts are not described herein again. As shown in FIG. 7, the cloud robot system 600 includes: a robot terminal device 602 and a cloud server 601;

the cloud server 601 includes: a first communication device 6011, a first memory 6012, one or more first processors 6013, and one or more first modules, the one or more first modules are stored in the first memory 6012 and are configured to be executed by the one or more first processors 6013, and the one or more first modules include instructions for executing various steps executed in the first operating system in any one of the above methods.

The robot terminal device 602 includes: an external device 6021, a second communication device 6022, a second memory 6023, one or more second processors 6024, and one or more second modules, the one or more second modules are stored in the second memory 6023 and are configured to be executed by the one or more second processors 6024, and the one or more second modules include instructions for executing various steps executed in the second operating system in any one of the above methods.

The external device 6021 is a device that is connected to the robot terminal and runs its driving program in the electronic device.

Seventh Embodiment

Based on the same inventive concept, the embodiment of the present application further provides a computer program product. Since the principle is similar to the device detection method, the implementation can refer to the implementation of the method, and the repeated parts are not described herein again. The computer program product includes a computer readable storage medium and a computer program mechanism embedded therein, and the computer program mechanism includes instructions for executing various steps in any one of the above methods.

For the convenience of description, the various parts of the above apparatus are divided into various modules according to functions to be described respectively. Of course, the functions of the modules or units can be implemented in the same one or more software or devices during the implementation of the present application.

Those skilled in the art should be aware that the embodiment of the present application can be provided as a method, a system or a computer program product. Thus, the present application can take the form of an entirely hardware embodiment, an entirely software embodiment, or an embodiment combining software with hardware. Moreover, the present application can take the form of a computer program product implemented on one or more computer usable storage media (including, but not limited to, a disk memory, a CD-ROM, an optical memory and the like) including computer usable program codes.

The present application is described with reference to the flowcharts and/or block diagrams of the method, device (system) and the computer program product according to the embodiments of the present application. It should be understood that each flow and/or block in the flowcharts and/or block diagrams, and combinations of the flows and/or blocks in the flowcharts and/or block diagrams can be implemented by computer program instructions. These computer program instructions can be provided to a processor of a general purpose computer, a special purpose computer, an embedded processor or other programmable data processing devices to produce a machine, so that instructions executed by the processors of the computers or other programmable data processing devices generate an apparatus for implementing specified functions in one or more flows in the flowcharts and/or one or more blocks in the block diagrams.

These computer program instructions can also be stored in a computer readable memory capable of guiding the computers or the other programmable data processing devices to work in particular manners, such that the instructions stored in the computer readable memory generate products including instruction apparatuses, and the instruction apparatuses achieve the specified functions in one or more flows of the flowcharts and/or one or more blocks of the block diagrams.

These computer program instructions can also be loaded on the computers or the other programmable data processing devices, to execute a series of operation steps on the computers or the other programmable data processing devices to produce processing achieved by the computers, such that the instructions executed on the computers or the other programmable data processing devices provide steps used for achieving the specified functions in one or more flows of the flowcharts and/or one or more blocks of the block diagrams.

Although the preferred embodiments of the present application have been described, those skilled in the art can make additional changes and modifications to these embodiments once knowing the basic creative concepts. Therefore, the appended claims are intended to be interpreted as including the preferred embodiments and all changes and modifications falling within the scope of the present application.

The invention claimed is:

1. A device detection method, comprising:
in a first operating system, when a device detection instruction sent by a device detection program is detected, determining a driving program operation instruction corresponding to the device detection instruction, and transmitting the driving program operation instruction to a second operating system;
in the second operating system, operating a corresponding driving program according to the driving program operation instruction, and feeding back an operation result to the first operating system; and
in the first operating system, returning the operation result to the device detection program;
wherein operating the corresponding driving program according to the driving program operation instruction refers to:
only when it is determined that the driving program operation instruction satisfies preset security conditions, operating the corresponding driving program according to the driving program operation instruction; or
only when the corresponding driving program operation instruction is in an idle state, operating the corresponding driving program according to the driving program operation instruction.

2. The method according to claim 1, wherein,
the preset security conditions comprise:
a security level of the first operating system is greater than a preset level; or,
the first operating system is an operating system securely running in a system minimum mode; or,
the first operating system is an authenticated operating system.

3. The method according to claim 1, wherein the first operating system and the second operating system are located on different terminals.

4. An electronic device, comprising:
an external device, a memory, one or more processors, and one or more modules, wherein the one or more modules are stored in the memory and are configured to be executed by the one or more processors, and the one or more modules comprise instructions for executing various steps in the method according to claim 1.

5. The electronic device according to claim 4, wherein,
the preset security conditions comprise:
a security level of the first operating system is greater than a preset level; or,
the first operating system is an operating system securely running in a system minimum mode; or,
the first operating system is an authenticated operating system.

6. A cloud robot system, comprising a robot terminal device and a cloud server;
wherein the cloud server comprises: a first communication device, a first memory, one or more first processors, and one or more first modules, the one or more first modules are stored in the first memory and are configured to be executed by the one or more first processors, and the one or more first modules include instructions for executing various steps executed in the first operating system; and
the robot terminal device comprises: an external device, a second communication device, a second memory, one or more second processors, and one or more second modules, the one or more second modules are stored in the second memory and are configured to be executed by the one or more second processors, and the one or more second modules comprise instructions for executing various steps executed in the second operating system;
wherein the various steps include:

in the first operating system, when a device detection instruction sent by a device detection program is detected, determining a driving program operation instruction corresponding to the device detection instruction, and transmitting the driving program operation instruction to a second operating system;

in the second operating system, operating a corresponding driving program according to the driving program operation instruction, and feeding back an operation result to the first operating system; and in the first operating system, returning the operation result to the device detection program.

\* \* \* \* \*